United States Patent [19]

Lowell

[11] 3,884,083
[45] May 20, 1975

[54] SURFACE AREA DETERMINATION BY DIRECT READ-OUT

[76] Inventor: Seymour Lowell, 42 Wood Hollow Rd., Albertson, N.Y. 11507

[22] Filed: May 17, 1974

[21] Appl. No.: 470,733

Related U.S. Application Data

[63] Continuation-in-part of Ser. No. 294,342, Oct. 2, 1972, abandoned.

[52] U.S. Cl. .......................................... 73/432 PS
[51] Int. Cl. .......................................... G01n 15/08
[58] Field of Search ................................. 73/432 PS

[56] References Cited
UNITED STATES PATENTS

| | | | |
|---|---|---|---|
| 2,960,870 | 11/1960 | Nelsen et al. | 73/432 PS |
| 3,211,006 | 10/1965 | Haley, Jr. | 73/432 PS |
| 3,211,007 | 10/1965 | Atkins | 73/432 PS |
| 3,464,273 | 9/1969 | Hendrix et al. | 73/432 PS |
| 3,555,912 | 1/1971 | Lowell | 73/432 PS |
| 3,783,697 | 1/1974 | Lowell et al. | 73/432 PS |

*Primary Examiner*—Richard C. Queisser
*Assistant Examiner*—Joseph W. Roskos
*Attorney, Agent, or Firm*—Bauer & Amer

[57] ABSTRACT

A surface area determination method that utilizes a selected mixture of 30 percent adsorbate (i.e., nitrogen) and 70 percent non-adsorbable carrier gas (i.e., helium) at which to achieve an initial adsorption of the nitrogen to said surface area being measured. Next, the nitrogen is desorbed and the volume thereof measured by a digital counter or integrator. This measurement, in contrast to prior art curve plotting and the like, consists of causing the counter to display multiples of a constant for each unit volume of the nitrogen. The constant that is used is related to the area that would be adsorbed by a monolayer of the nitrogen at one atmosphere and 25° C.

The inventiveness of the within method resides in advantageously using a continuous flow method to sweep the desorbed nitrogen into operating relation to the electronic digital counter, and in effectively neutralizing conditions of the nitrogen at the time of this sweep, such as its temperature and peak volume, which might otherwise cause false readings in said electronic digital counter.

2 Claims, 2 Drawing Figures

SURFACE AREA DETERMINATION BY DIRECT READ-OUT

This application is a continuation-in-part of application Ser. No. 294,342, filed Oct. 2, 1972, and now abandoned.

The present invention relates to improvements in obtaining surface measurement data using the technique of exposing said surface to a flowing gas mixture of an adsorbate and a non-adsorbable carrier gas, and more particularly to a significantly facilitated method of accurately measuring quantities of powder samples using the aforesaid technique.

It is already well known that gas absorption can advantageously be used to obtain surface measurement data. For example, assuming that nitrogen is the adsorbate, it is known that 1 cubic centimeter of this gas at 25°C. at one atmosphere of pressure and further existing as a monolayer adsorbed to the test powder surface will cover approximately 2.84 square meters of that test surface. The foregoing is the basis of measuring techniques using nitrogen or a similar adsorbate to determine the area of powder surfaces that are comprised of many particles. These techniques are generally disclosed in the patent literature, as for example in the Nelsen et al. U.S. Pat. No. 2,960,870 and Lowell et al. U.S. Pat. No. 3,555,912.

Heretofore, putting to practice the aforesaid surface determination technique has required repititious and tedious measurements. For example, a prerequisite to surface area determination according to prior art practice has first required the construction of several data points on the isotherm curves of the test powder sample.

Broadly, it is an object to provide a facilitated method of determining surface areas using the "continuous flow method" (i.e., the method of the aforesaid Nelsen et al. patent), and thereby overcoming the foregoing and other shortcomings of the prior art. More particularly, it is an object to obtain a direct read-out from an electronic digital counter or the like of the surface area being measured, and to do so while making advantageous use of said continuous flow method.

There has been some prior art effort, as exemplified by the Hendrix et al. patent, U.S. Pat. No. 3,464,273, to provide a direct read-out on a mechanical digital counter from a static volume of adsorbate, i.e., nitrogen, collected after the desorption step in a surface measuring procedure. The curve-plotting and tedium which this is intended to obviate, however, is unfortunately more than offset by the difficulty in moving and in handling the desorbed gas preparatory to operating the digital counter. In said Hendrix et al patented method, for example, the collected volume of adsorbate which is desorbed can only be effectively used indirectly to operate the mechanical digital counter. That is, said volume is used to dictate a piston position for a variable volume device operating at non-ambient pressures which, in turn, produces a mechanical digital counter read-out. Whenever the adsorbate is changed, however, there naturally must be a corresponding calibration of different piston positions to digital counter read-outs for said adsorbate. This calibration can only be done by changing to a variable volume device having the proper piston size and other physical parameters for the adsorbate being used.

In contrast, the within inventive method advantageously uses the continuous flow surface-measuring technique at essentially ambient pressure to provide a direct read-out on a digital counter. Thus, underlying the invention is the recognition that the conditions which produce continuous gaseous flow also will sweep the desorbed volume of nitrogen, or other selected adsorbate, into operating relation with the digital counter. In the within method, therefore, the gaseous volume is not required to be first related to physical conditions of the devices which contain it, and which necessarily restrict the use of each said volume-containing device to a specific adsorbate.

The above brief description, as well as further objects, features and advantages of the present invention, will be more fully appreciated by reference to the following detailed description of the improved method of the present invention using the exemplary apparatus illustrated in the accompanying drawings, to wit:

Underlying the present invention is the further recognition that the amount of nitrogen adsorbed and subsequently desorbed from a test surface at a relative pressure of 0.3 provides an accurate measurement of the size of the test surface for most practical purposes. Thus, the present invention contemplates exposing a test surface to a mixture of nitrogen and helium in a ratio of 30 percent nitrogen and 70 percent helium, and thus achieving the relative pressure of 0.3 previously mentioned, and then desorbing the nitrogen adsorbed as a result of the exposure and measuring said nitrogen. Each cubic centimeter of the desorbed nitrogen, as already noted, indicates a test powder surface area of approximately 2.84 square meters.

In accordance with the present invention, the foregoing is utilized to provide a direct read-out, on a digital display of an electronic digital integrator or other counting device, of the surface size of a test powder sample. This is achieved by monitoring or measuring the desorbed nitrogen at the aforesaid 0.3 relative pressure and having the digital display count and display 2.84 units for each cubic centimeter of desorbed nitrogen. Thus, for example, if three cubic centimeters of nitrogen is desorbed, the digital display will indicate a surface area of three times 2.84 or a size of 8.52 square meters in the test powder sample.

FIG. 1

Figure 1:
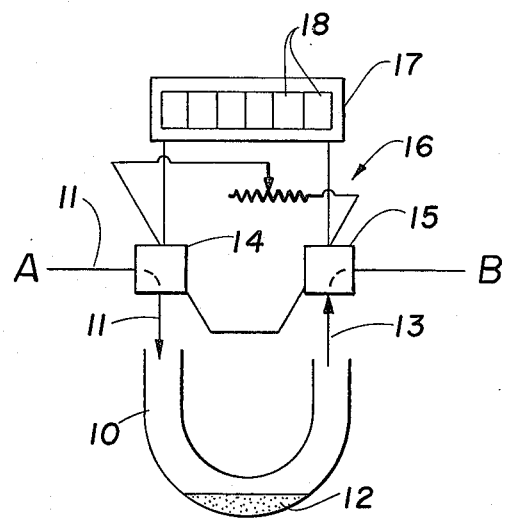
FIG. 1 is a diagrammatic view of surface-measurement apparatus.

The foregoing can be achieved in a practical, noteworthy way using the method illustrated diagramatically in FIG. 1. Specifically, a nitrogen-helium gas mixture 11 at a nitrogen relative pressure of 0.3 is introduced in vessel 10 at ambient pressure where adsorption to a powder test sample 12 occurs during passing relation of the gas mixture 11 with said surface 12. As generally understood, an appropriate input of pressure above ambient will produce continuous flow of the gas mixture 11. Gas 11 is monitored or measured by a measuring device 14 prior to contact with the test sample 12 and by a measuring device at 15 after such contact. As further generally understood, an acceptable measuring arrangement which includes the devices 14 and 15 is a wheatstone bridge 16. That is, the major component part of the devices 14 and 15 are, respectively, coils which are heated to known temperatures with which the nitrogen-helium gas mixture 11 passes in heat-exchange relation. Since it is known that nitrogen is a poorer heat conductor than helium, when the gas mixture 11 is rich in nitrogen, there will be a corresponding rise in the temperature of the coils 14, 15. Naturally, the converse is also true. Thus, when the gas mixture is passed in heat-exchange relation with the coil 14 on entrance into the vessel 10, coil 14 assumes a temperature which initially will be greater than the temperature of coil 15. This follows because the gas mixture 11 upon exiting from the vessel 10 will be richer in helium since a portion of the nitrogen will have been adsorbed during the sweep of the gas mixture over the test sample 12. However, ultimately the test sample will be saturated with adsorbed nitrogen and the temperature of the coils 14 and 15 will reach equilibrium. Since the resistance of the coils 14 and 15 is a function of their temperature, the generated voltage of the wheatstone arrangement 16 is also a function of the temperature of the coils. All of the foregoing is well understood.

Once equilibrium is reached, vessel 10 is subjected to ambient temperature or a temperature of approximately 25° C. In such an environment, all of the previously adsorbed nitrogen is then desorbed. The desorbed nitrogen 13 passes in heat-exchange relation with the coil 15 changing the resistance characteristic of this coil and, in a well understood manner, results in a generated voltage which is a function of the amount of nitrogen which passes in heat-exchange relation with the coil 15. This generated voltage is operatively arranged to control the operation of an electronic digital integrator or counter 17 such that the digital display 18 thereof counts off and displays 2.84 units for every increment of inputgenerated voltage which is equivalent to one cubic centimeter of desorbed nitrogen. In this manner, the electronic digital integrator or other counting device 17 provides a direct read-out on its digital display 18 of the surface measurement of the test sample 12. Any one of numerous, conventional voltage-operated digital counters may be utilized as the counter 17.

FIG. 2

Figure 2:
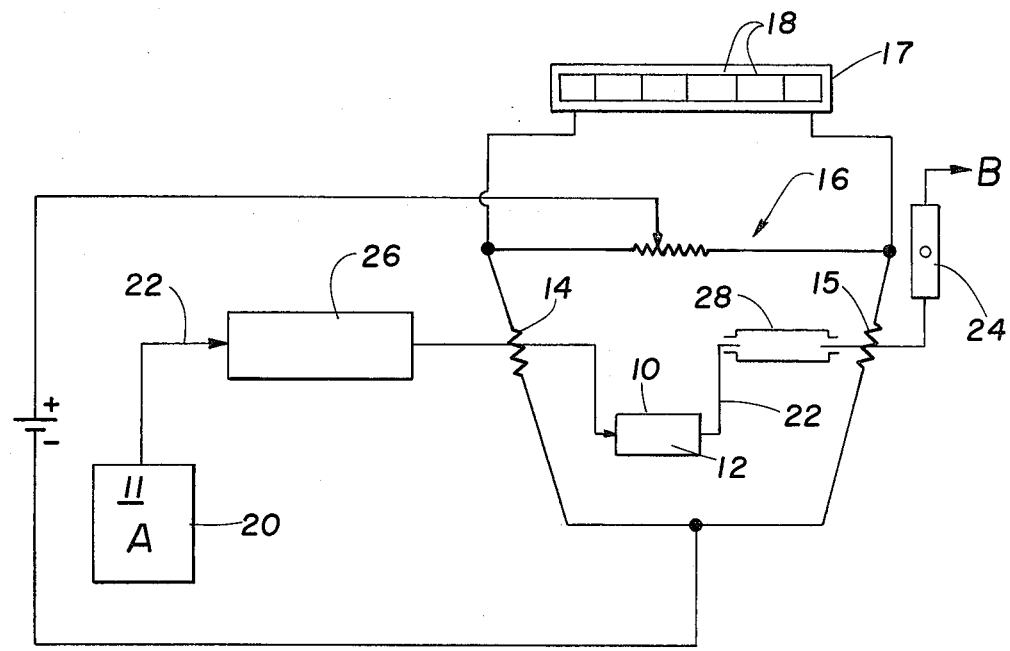
FIG. 2 is similarly a diagrammatic view, but illustrates further structural details of said apparatus.

Attention is directed now to FIG. 2, wherein the method generally described in connection with FIG. 1 is again diagramatically illustrated, but this time in conjunction with apparatus and other structural details which enable the same to be practiced in a greatly facilitated manner. As already noted, there is a continuous flow of helium-nitrogen gas mixture between points A and B. In practice, at point A there is a high pressure source of the helium and nitrogen, such as tanks 20 containing these gases. It will be understood that associated with tanks 20 are conduits and valves for mixing the helium and nitrogen in a ratio of 30 percent nitrogen to 70 percent helium and then flowing the same through a conduit 22 which channels the mixture into vessel 10 containing the test sample 12. Alternatively, the source can be a single tank of pre-mixed gas. In accordance with the present invention, a selected constant rate of flow is required in the helium-nitrogen gas mixture 11 flowing through the conduit 22. This constant rate of flow is visually determined using a flow meter 24 at the exit point B. Flow meter 24 may be one having the construction and mode of operation of the flow meter described and illustrated in U.S. Pat. No. 3,623,365.

In the general description of the within method provided in connection with FIG. 1 it was indicated that the helium-nitrogen gas mixture 11 is initially adsorbed by the test sample 12, by cooling the sample, and then subsequently desorbed therefrom, by warming the same. By virtue of this adsorption and desorption there is of necessity variation caused in the volume of the gas mixture 11 during its flow between points A and B. Unless there is a suitable adjustment, this variation in volume could adversely affect the rate of flow of the gas mixture. Accordingly, between points A and B there is provided a flow control means 26 which imposes a fixed input line pressure, of preferably three pounds per square inch, on the gas mixture, which in practice, has been found to be adequate to provide the constant flow rate required.

Although it is theoretically possible to provide a digital display 18 on the counter 17 corresponding to the amount of nitrogen which is adsorbed by the test sample 12, it is not practical to do so. The reason is that to achieve adsorption of nitrogen to the test sample surface it is necessary to drastically lower the temperature of the test sample 12 using liquid nitrogen. This severe reduction in temperature is of course also produced in the helium, or carrier gas portion of the gas mixture 11, as it flows out of the vessel 10 and into heat exchange relation with the coil 15. This, of course, will produce a temperature variation in the coil 15 and a corresponding change in its electrical resistance. Since this is due, at least in part, to the temperature variation produced in the helium independent of the variation in the ratio between the helium and nitrogen, this temperature variation in the coil 15 would give a false or incorrect indication of the surface area of the test sample 12 being measured. In other words, the measurement of the within method monitors changes in the ratio of helium and nitrogen in the gas mixture 11, the same indicating whether it is helium rich or nitrogen rich, and contemplates that on this basis there will be a corresponding change in the temperature of the coil 15 when the gas mixture passes in heat exchange relation therewith. Error is obviously introduced if the temperature of the coil 15 is affected by the temperature of either the helium or nitrogen irrespective of any change in the ratio of these individual parts of the gas mixture.

It is thus provided in accordance with the present invention that the digital counter 17 be operated in accordance with the volume of nitrogen which, after being adsorbed to the test sample 12, is subsequently desorbed therefrom. This desorbed volume of nitrogen is at approximately 25° C. when desorbed from the test sample, and thus does not introduce the previously discussed temperature-variation problem.

An important contribution of the present invention is the recognition that the nitrogen desorbed from the test sample 12, which it is intended to use in operating the digital counter 17, is conveniently swept from the vessel 10 into heat exchange relation with the coil 15 by the gas mixture which is continuously flowing between points A and B. That is, in this facilitated manner, the volume of desorbed nitrogen, which provides a measurement of the surface area of the test sample 12, is conveniently and in a greatly facilitated manner removed from the vessel 10 containing the test sample 12 and carried to a station 15, at which it is readily used in a measuring procedure or technique. It is only necessary to neutralize the sudden increase in volume that the desorbed nitrogen produces in the gas mixture 11 flowing between points A and B. If not neutralized, the additional volume of desorbed nitrogen would in effect be tantamount to a rapid expansion of the gas mixture through and beyond station 15, such that there is inadequate time for a heat exchange procedure to occur at the station or coil 15. In other words, despite the gas mixture 11 becoming nitrogen-rich, because it also experiences an increase in volume, it may not properly result in a temperature rise in the coil 15 because of the rapidity in which it passes through the coil 15. It is therefore provided in accordance with the present invention that between the vessel 10 and coil 15 that the gas mixture 11 enter and flow through a flow chamber 18, which will be understood to have a significantly increased volume as compared with the conduit 22. In effect, the increased volume contributed to the flow system by the flow chamber 28 accommodates the increase in volume contributed to the gas mixture 11 by the nitrogen desorbed from the test sample 12, so that overall there is no significant change in the rate of flow of the gas mixture 11 when it passes in heat exchange relation to the coil 15. In the event that there is a significant increase in the flow rate of the exiting gas mixture 11, this will be visually indicated by the flow meter 24, thus invalidating the test. On the other hand, it will be known that the within method has been practiced properly if the flow meter 24 indicates that the exiting gas mixture 11 is flowing at the rate of flow selected to insure that during the interval of time it passes in heat exchange relation with the coil 15 that the temperature of coil 15 is affected primarily by the nitrogen-rich nature of the gas mixture 11.

As already noted, the final step of the within method is to produce a direct read-out on the digital counter 17 using the voltage which is generated at the coil 15 in the wheatstone bridge 16. It should be well understood by those versed in the art that this is done by causing counting operation of the digital counter 17 at a frequency which is related to said voltage and which, in turn, will provide the number of counts per unit volume of adsorbate. For example, at a given flow rate in the gas mixture 11 it can be readily determined what interval of time is required for the flowing of one cubic centimeter of an adsorbate, such as nitrogen. During this interval of time, also as already noted, there should be 284 counts produced in the digital counter 17 to indicate a test powder surface area of approximately 2.84 square meters which is the area required to produce said 1 cubic centimeter of desorbed nitrogen. It can also be readily determined to what extent each cubic centimeter of nitrogen affects the temperature of the coil 15 and further the voltage change this will produce in the wheatstone bridge 16. The latter is then used in accordance with the present invention to power the digital counter 17 in counting operation at an appropriate frequency.

When it is desired to use an adsorbate other than nitrogen, this will of course require corresponding changes in the frequency of the counting operation of the digital counter 17, all as is subsequently explained in detail. Specifically, let it be assumed that butane, rather than nitrogen is used as the adsorbate. It would be plausible to use butane since its normal liquification temperature is close to 0° C. and it completely desorbs from most surfaces at 150° C. Therefore, an ice water slurry and heating mantle are all that is required for its use as an adsorbate. When using this gas as an adsorbate, it is required that every cubic centimeter of butane indicate 8.16 square meters of surface area. It is therefore necessary to cause the integrator to give 8.16 counts for every cubic centimeter of butane that is desorbed. Other adsorbates will require a different number of counts for each cubic centimeter of the adsorbate that is desorbed. The general formula and procedure for obtaining the number of counts should be readily determinable by those skilled in the art but, for completeness sake, is set forth below:

Making the assumptions that adsorption is at one atmosphere, at a relative pressure of 0.3 and 25° C., the mathematical formula for determining the numerical value or constant to be multiplied by the number of cubic centimeters of desorbed adsorbate, simplifies to:

$$S_t = 1.74 \times 10^{19} \text{ Ac. s. } V$$

(I)

where:
$S_t$ = the surface area being measured,
$V$ = the volume of the adsorbate, and
Ac. s. = the adsorbate's cross sectional area expressed in $cm^3$.

Commonly accepted values of the cross sectional area, in square angstroms ($10^{-20}$ meters), for the below listed adsorbates are:

| Adsorbate | Cross Sectional Area |
|---|---|
| Nitrogen | 16.2 |
| Krypton | 19.5 |
| Argon | 14.2 |
| Xenon | 25.0 |
| Oxygen | 14.0 |
| Ethane | 20.5 |
| Butane | 46.9 |

Thus, a numerical value related to each cubic centimeter can be calculated for each adsorbate, i.e., a constant which is the equivalent of the value 2.84 for nitrogen.

As an example, consider butane as the adsorbate. Equation (I) rewritten for butane becomes:

$$S_t = 8.16V$$

It is therefore necessary to cause the integrator or counter 17 to give 8.16 counts on its digital display 18 for each 1.0 cc of butane that is passed in controlling or operating relation therewith.

In a similar manner, a constant similar to the values 2.84 and 8.16 for nitrogen and butane, respectively, can be determined and used, as described herein, for direct read-out operation of the counter 17.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A method of determining the surface area of a solid material comprising the steps of forming a gaseous mixture of an adsorbate and a relatively nonadsorbable carrier gas in the ratio of 30 percent of the former to 70 percent of the latter, calibrating a digital counter having a digital display so as to display a selected numerical value for each unit volume of said adsorbate which corresponds to the surface area to which a monolayer of said adsorbate will adsorb at specified conditions of pressure and temperature, establishing pressure conditions to produce a continuous flow at a selected rate of flow of said gaseous mixture to measuring means controlling the display of said digital counter, flowing and continuously flowing gas mixture prior to encountering said measuring means over the surface of a sample of solid material at a selected reduced temperature at which adsorption of the adsorbate takes place to thereby cause adsorption of said adsorbate to said surface, while maintaining said continuous flow at said selected flow rate of said gaseous mixture raising the temperature of said sample of solid material to cause desorption of said adsorbate from said surface into said continuously flowing gaseous mixture to provide an additional volume of adsorbate for intermixture therewith, directing said gaseous mixture with said additional volume through a flow chamber of a correspondingly increased volume so that said previously noted selected rate of flow is substantially maintained therein by virtue of said increased volume flowing at a slower rate through said flow chamber, and causing the measurement of said continuously flowing gaseoud mixture with said additional volume of said adsorbate by operating said calibrated digital counter therewith and having said digital display of said digital counter display multiples of said selected numerical value for each unit volume of said adsorbate.

2. A method of determining the surface area of a solid material using a digital counter as claimed in claim 1 wherein said adsorbate is nitrogen.

* * * * *

UNITED STATES PATENT OFFICE
CERTIFICATE OF CORRECTION

PATENT NO. : 3,884,083
DATED : May 20, 1975
INVENTOR(S) : Seymour Lowell

It is certified that error appears in the above-identified patent and that said Letters Patent are hereby corrected as shown below:

Claim 1, col. 7, line 12, the word "and" should be "said".

" 1, " 3, " 11, the word "gaseoud" should be "gaseous".

Signed and Sealed this

*twenty-third* Day of *September 1975*

[SEAL]

*Attest:*

RUTH C. MASON
*Attesting Officer*

C. MARSHALL DANN
*Commissioner of Patents and Trademarks*